Nov. 4, 1969 P. E. PERKINS ET AL 3,476,877

SPACECRAFT TELEPRINTER USING THERMAL PRINTING TECHNIQUES

Filed Nov. 15, 1967 3 Sheets-Sheet 1

FIG. I

INVENTORS
PAUL E. PERKINS,
WARREN E. PERKINS,
DAVID E. THOMAS &
JAMES W. TAYLOR

BY Louis A. Kline
John J. Callahan
Glenn W. Bones

THEIR ATTORNEYS

INVENTORS
PAUL E. PERKINS,
WARREN E. PERKINS,
DAVID E. THOMAS &
JAMES W. TAYLOR

BY Louis A. Kline
John J. Callahan
Glenn W. Bowes
THEIR ATTORNEYS

Nov. 4, 1969 P. E. PERKINS ET AL 3,476,877
SPACECRAFT TELEPRINTER USING THERMAL PRINTING TECHNIQUES
Filed Nov. 15, 1967 3 Sheets-Sheet 3
FIG. 3
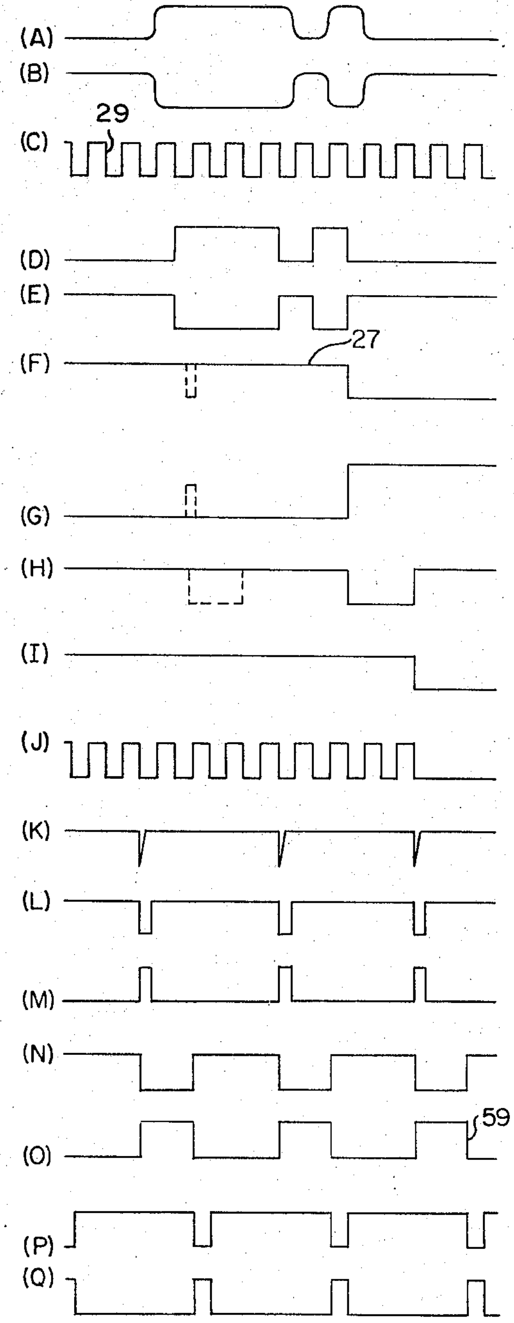
FIG. 4
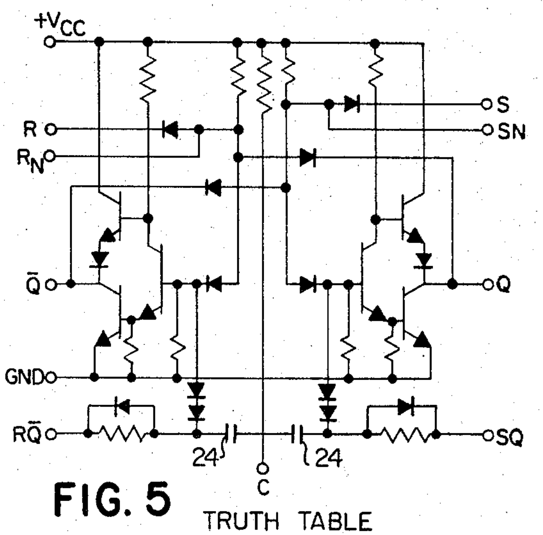
FIG. 5
TRUTH TABLE
| CLOCKED SET-RESET | | | |
|---|---|---|---|
| SQ | RQ̄ | $Q_{(n+1)}$ | $\bar{Q}_{(n+1)}$ |
| 0 | 0 | ** | ** |
| 0 | 1 | 1 | 0 |
| 1 | 0 | 0 | 1 |
| 1 | 1 | $Q_n$ | $\bar{Q}_n$ |
LOGIC DEFINITION: 1 — STATE ~ 2V.
0 — STATE ~ 0.3V
** INDETERMINATE
FIG. 6
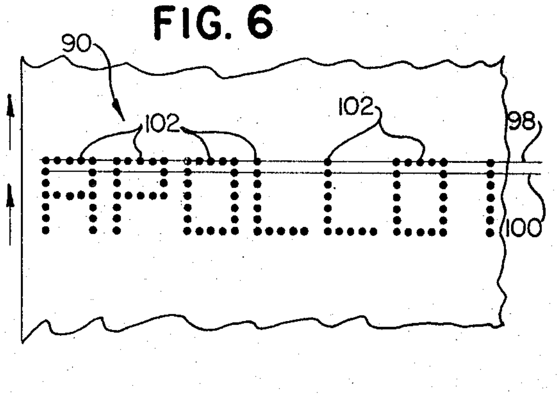
INVENTORS
PAUL E. PERKINS,
WARREN E. PERKINS,
DAVID E. THOMAS &
JAMES W. TAYLOR
BY Louis A. Prine
John J. Callahan
Glenn W. Bones
THEIR ATTORNEYS United States Patent Office 3,476,877
Patented Nov. 4, 1969

3,476,877
SPACECRAFT TELEPRINTER USING THERMAL PRINTING TECHNIQUES

Paul E. Perkins, Dayton, Warren E. Perkins and David E. Thomas, Centerville, and James W. Taylor, Dayton, Ohio, assignors to The National Cash Register Company, Dayton, Ohio, a corporation of Maryland Filed Nov. 15, 1967, Ser. No. 683,319
Int. Cl. H041 *15/34, 17/16*
U.S. Cl. 178—23 4 Claims

ABSTRACT OF THE DISCLOSURE

A remote thermal printer for printing on a thermally sensitive record material under the control of a data processor which supplies both clock and information signals to the remote thermal printer is disclosed. Each of N silicon controlled-rectifiers is connected to *P/N* semiconductor diodes which are in turn each connected to P/N electrically resistive thermal printing elements. Each of M grounding transistors is coupled to *P/M* thermal printing elements, where M multiplied by N equals P. Simultaneous energization of both a silicon controlled-rectifier and a grounding transistor results in electrical current flow through one of the P thermal printing elements. An N-stage shift register sequentially stores groups of N data bits as they are transmitted from the data processor. An N-stage binary counter counts the incoming data bits and resets itself upon the completion of each N count. When N data bits have been received from the data processor, all of the stored data bits in the N-stage shift register are simultaneously supplied to the gate terminals of the silicon controlled-rectifiers. A second binary counter, having M stages, is coupled to the N-stage binary counter, and it counts once for each group of N counts of the N-stage binary counter. A control signal, derived from the M-stage binary counter, is individually and consecutively supplied to the base electrode of the M grounding transistors in accordance with the count in the M-stage binary counter.

The invention described herein was made in the performance of work under a NASA contract and is subject to the provisions of Section 305 of the National Aeronautics and Space Act of 1958, Public Law 85-568 (72 Stat 435; 42 U.S.C. 2457).

Background of the invention

The remote thermal printing system of the present invention is ideally suited for space craft applications and other applications in which the physical size of the thermal printing device must be minimized. Prior thermal printers, which require complex electronic circuitry for translating coded input information signals into usable printing instructions, are too complex and too bulky for thermal printing in such applications. The only moving mechanical parts in the thermal printing system of the present invention are those concerned with the paper advance mechanism. The required ordering of the data bits is achieved by a remote data processor, and therefore no decoding matrix is required.

Another advantage of the thermal printer of the present invention is its ability to print any type of information, including alpha-numeric information, which may be printed by means of individual dots.

Summary of the invention

A remote thermal printing system for printing on thermally sensitive record material is provided. A data processor supplies clock pulses and a predetermined number of data bits to the thermal printing system during each print cycle. The remote thermal printing system counts the number of data bits that are received from the data processor and uses this count to control the sequential energization of selected groups of electrically resistive thermal printing elements, so that information, in the form of a row of dots, is printed on a thermally sensitive record material in accordance with the received data. The thermal printing system re-establishes its own initial conditions for each print cycle following the absence of data bits for a predetermined time.

Brief description of the drawings

FIGURE 3 is a waveform diagram showing the waveforms that are present at selected points of FIGURE 1.

FIGURE 4 is a schematic diagram of a DTL pulse binary counter integrated circuit that is employed.

FIGURE 5 is a truth table for the DTL pulse binary counter integrated circuit of FIGURE 4.

FIGURE 6 is a diagrammatic view of a thermally sensitive record material containing printed information in the form of rows of dots.

Description of the preferred embodiment

The thermal printing system of the present invention employs a thermal printing head which prints on a thermally sensitive record material that is placed adjacent to the thermal printing head. A number of commercially available thermally sensitive record materials which may be employed with the present invention are available. One particularly suitable thermally sensitive record material is described in United States Patent No. 3,293,055, issued on Dec. 20, 1966, on the application of Henry H. Baum. A number of electrically resistive thermal printing heads for use in the present invention are also available. One particularly suitable thermal printing head is described in United States Patent No. 3,161,457, issued on Dec. 15, 1964, on the application of Hans Schroeder, William H. Puterbaugh, Jr., and Robert C. Meckstroth. This thermal printing head consists of elements that are made of an electrically resistive material, such as tin oxide, which heats when conducting an electrical current. Printing occurs on a thermally sensitive record material which is placed adjacent to an energized thermal printing element.

Figure 1:
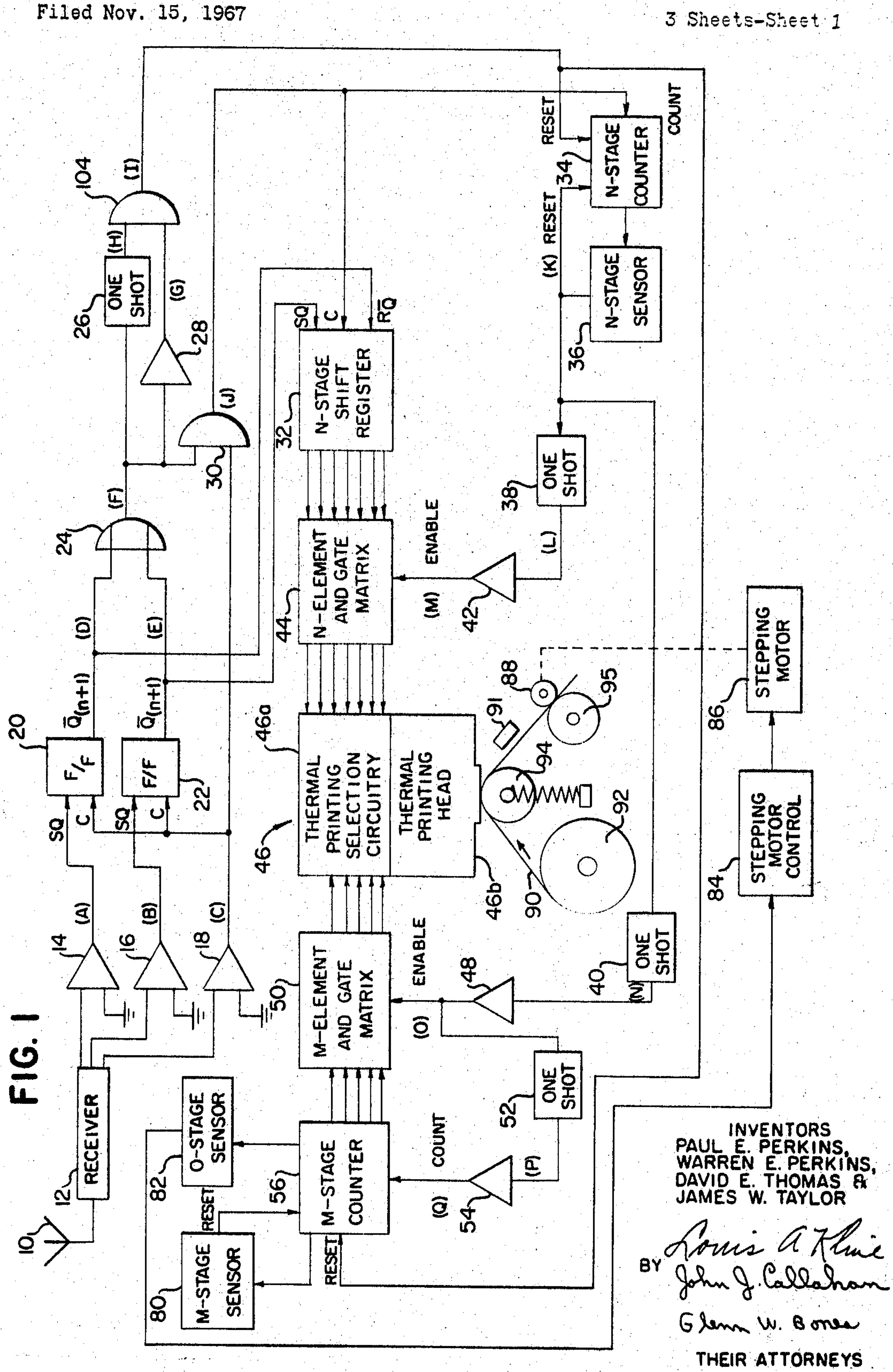
FIGURE 1 is a logic diagram of the thermal printing system of the present invention.

The logic diagram for the thermal printing system is shown in FIGURE 1. Data and clock signals are transmitted to the remote thermal printing device from a data processor (not shown) by electromagnetic radiation or other suitable means. The data signals and the clock signals that are received by the thermal printing device are coupled from the antenna 10 to the receiver 12, where the data signals and the clock signals are separated. Data signals representing "1's" are coupled to the differential amplifier 14, data signals representing "0's" are coupled to the differential amplifier 16, and the clock signals are coupled to the differential amplifier 18. The differential amplifiers 14, 16, and 18 are used to eliminate noise and to establish voltage levels. The output of the differential amplifier 14 is shown as waveform A, the output of the differential amplifier 16 is shown as waveform B, and the output of the differential amplifier 18 is shown as waveform C, in FIGURE 3.

The data signals which appear at the outputs of the differential amplifiers 14 and 16, as shown by the waveforms A and B of FIGURE 3, respectively, have a rounded or deteriorated wave shape. The clocked flip-flops 20 and 22 improve the rise time and the fall time of the waveforms A and B and shape these waveforms as shown in FIGURE 3 by the waveforms D and E, respectively.

The flip-flop circuits 20 and 22 are integrated DTL (diode-transistor logic) pulse binary counter circuits. The schematic diagram for the flip-flops 20 and 22 is shown in FIGURE 4. The truth table for the circuit of FIGURE 4 is illustrated by FIGURE 5. The clocked flip-flop circuit of FIGURE 4 will not be described in detail, since it is a commercially-available integrated circuit. The circuit shown in FIGURE 4 is a Westinghouse integrated circuit having the designation WM213Q, WM213T, or WM213G. It should be noted, however, that the SQ and the RQ inputs are resistively coupled inputs, while the C (clock) input is a capacitively coupled input due to the presence of the capacitors 25. A change of state, therefore, occurs in the circuit of FIGURE 4 only when a trailing edge of the clock waveform, such as the trailing edge 29 of waveform C of FIGURE 3, for example, occurs. The present invention is not limited to the described circuit of FIGURE 4, however, since other pulse-shaping circuits may also be employed to achieve pulse-shaping.

The output of the flip-flop 20 is shown as the waveform D, and the output of the flip-flop 22 is shown as the waveform E in FIGURE 3. The outputs of the both of the flip-flops 20 and 22 are coupled to the OR gate 24, which is coupled to the one-shot multi-vibrator 26 and to the inverter 28. The ouput of the OR gate 24 is shown as the waveform F, the output of the inverter 28 is shown as the waveform G, and the output of the one-shot multi-vibrator 26 is shown as the waveform H, in FIGURE 3. Once transmission of information has been initiated, the data processor consecutively supplies data bits to the remote thermal printing system. Since the OR gate 24 performs a logical OR function for the waveforms D and E, the OR gate 24 should be satisfied during the entire message portion of the print cycle. The portion 27 of the waveform F is derived from the OR gate 24 while information is being received from the data processor.

The AND gate 30 is coupled to the clock differential amplifier 18 and to the OR gate 24 and performs the AND function for the waveforms F and C. The output of the AND gate 30 is shown as the waveform J, in FIGURE 3. The AND gate 30, therefore, allows the clock signals of waveform C to pass through the AND gate 30 as the waveform J during the time that data is being received from the data processor.

The outputs of the flip-flops 20 and 22 are coupled to the N-stage shift register 32, which is constructed with the integrated circuits of FIGURE 4. The output of the flip-flop 20 is coupled to the SQ input of the shift register 32, the output of the flip-flop 22 is coupled to the RQ input of the shift register 32, while the AND gate 30 is coupled to the C input of the shift register 32 and to the N-stage counter 34. The trailing edge of each of the gated pulses of waveform J determines the time at which shifting occurs in the shift register 32. The N-stage binary counter 34 counts once for each pulse that it receives from the AND gate 30. Therefore, when the N-stage shift register 32 has received N data bits, the N-stage binary counter 34 will have completed N counts. The N-stage sensing circuit 36 senses that the N-stage binary counter 34 has reached the Nth count, and it supplies waveform K to the one-shot multi-vibrator 38, to the one-shot multi-vibrator 40, and also to a reset input of the N-stage binary counter 34. When the N-stage binary counter 34 is reset, the one-shot multi-vibrator 38 produces the waveform L, while the one-shot multi-vibrator 40 produces the waveform N. The output of the one-shot multi-vibrator 38 is inverted by the inverter 42 to produce the waveform M, which is supplied to the enabling terminal of the N-element AND gate matrix 44. The N-element AND gate matrix 44 may be constructed of any elements known to those skilled in the art, but an N-diode AND gate matrix is preferred because of its simplicity. N selection inputs of the N-element AND gate matrix 44 are each coupled to one stage of the N-stage shift register 32. Therefore, when the enabling waveform M is supplied to the N-element AND gate matrix 44 by the inverter 42, the desired selection signals from the N-stage shift register 32 are simultaneously supplied to the thermal printing head and the thermal printing selection circuitry section 46 through the enabled N-element AND gate matrix 44.

The output of the one-shot multi-vibrator 40 is inverted by the inverter 48 to produce the waveform O, which is supplied to the enabling terminal of the M-element AND gate matrix 50. The M-element AND gate matrix may also be constructed of any elements known to those skilled in the art, but, again, an M-diode AND gate matrix 50 is preferred. The output waveform M of the inverter 42 is also supplied to the one-shot multi-vibrator 52 to produce the waveform P. The waveform P output of the one-shot multi-vibrator 52 is inverted by the inverter 54 to produce the waveform Q. The waveform Q is supplied as a counting pulse to the M-stage counter 56. Therefore the M-stage counter 56 advances its count once for every group of N data bits that are received by the remote thermal printer. As shown in FIGURE 3, the waveform Q is initiated on the trailing edge portion of the waveform O; for example, the trailing edge 59. Thus, the M-stage counter 56 advances its count following the completion of printing of each group of N data bits on the thermally sensitive record material. The waveform M, therefore, corresponds to a SAMPLE DATA instruction, whereas the waveform O corresponds to a PRINT instruction.

Figure 2:
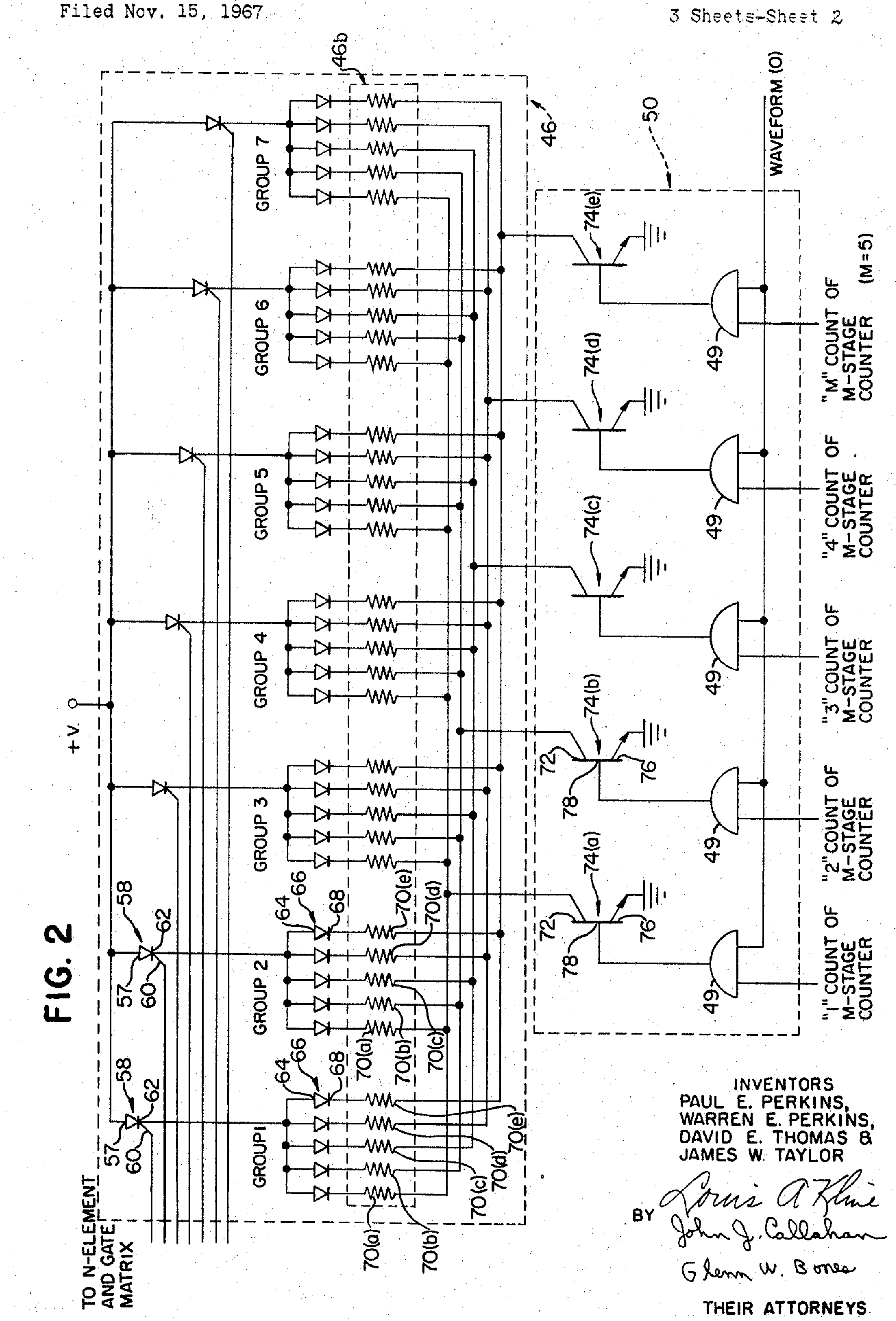
FIGURE 2 is a schematic diagram of a thermal print head and its associated selection circuitry section.

The thermal print head and selection circuitry section 46 is shown in schematic form in FIGURE 2. The anode electrodes 57 of the silicon controlled-rectifiers 58 are coupled to a positive voltage source, and the gate terminals 60 of the silicon controlled-rectifiers 58 are each coupled to one of the N selection lines from the N-element AND gate matrix 44. The cathode electrodes 62 of the silicon controlled-rectifiers 58 are connected to the anode electrodes 64 of a number of semi-conductor diodes 66. The cathode electrode 68 of each of the semi-conductor diodes is connected to an electrically resistive thermal printing element 60. One terminal of each of the thermal printing elements 70 is coupled to the collector electrode 72 of a grounding transistor 74. The emitter electrodes 76 of the grounding transistors 74 are each coupled to an individual stage of the M-stage counter 56. As the M-stage counter 56 cycles through its count, the M grounding transistors 74 are individually energized by the application of consecutive energization pulses to their base electrodes 78 by the associated stages of the M-stage counter 56. Current will therefore flow through a selected electrically resistive thermal printing element 70 when the associated silicon controlled-rectifier 58 has been triggered "on" by a gate voltage that is supplied to it from the N-element AND gate matrix 44 and the associated grounding transistor 74 has been selectively saturated. Thus, following the receipt of the first group of N data bits, the grounding transistor **74*a*, which is associated with the first electrically resistive thermal printing element 70 of each group of thermal printing elements (that is, the electrically resistive thermal printing elements 70** that are labeled (*a*)), is the only grounding transistor 74(*a*) which is selectively saturated, since it alone is energized when the M-stage counter 56 is in a "0" count condition. When the M-stage counter 56 produces a "1" count, the grounding transistor 74(*b*) is the only transistor which is selectively saturated, and, therefore, the electrically resistive thermal printing elements 70 that are labeled (*b*) are the only thermal printing elements which may be selectively energized during the receipt of the second group of N data bits. The electrically resistive thermal printing elements 70 that are energized during the receipt of any group of N data bits are, of course, determined by the silicon controlled-rectifiers 58 that are energized by the N-stage shift register 32 at that time. It should be noted from FIGURE 3 that the enabling waveform M that is applied to the N-element AND gate matrix 44 is substantially shorter in duration than the waveform O, which is supplied as an enabling waveform to the M-element AND gate matrix 50. When an AND gate 49 of the AND gate matrix 50 is energized, its associated grounding transistor 74 will be in a saturated state, its collector 72 will be approximately at a ground potential, and the cathode 62 of any silicon controlled-rectifier 58 which is coupled to the collector 72 through a diode 66 and a resistor 70 will also be at approximately a ground potential. Therefore, signals on the associated gate terminal 60 will be effective at this time to drive the silicon controlled-rectifier 58 into a conducting state. This is possible since it is a characteristic of a silicon controlled-rectifier that, once a silicon controlled-rectifier has been energized by the application of a gate voltage to its gate terminal, conduction will continue through the silicon controlled-rectifier as long as the applied potential is maintained across the silicon controlled-rectifier; and the silicon controlled-rectifier can then be turned off only by interrupting the load current. In the present invention, interruption of the load current through a silicon controlled-rectifier 58 occurs when the waveform O signal from the inverter 48, of FIGURE 1, returns to its 0 state, disenabling the AND gates 49 of FIGURE 2, which results in turning off the previously-saturated associated grounding transistor 74.

When the M-stage counter 56 has completed M counts, all of the thermal printing elements 70 have had an opportunity to be selected. In this respect, it may be seen that each of the P electrically resistive thermal printing elements has an opportunity to print a dot on the thermally sensitive record material without movement of the thermally sensitive record material. The M-stage sensor 80 senses when the Mth count of the M-stage counter 56 occurs, and it supplies a reset pulse to the M-stage counter 56. When the M-stage counter 56 is reset, the O-stage sensor 82 senses that the M-stage counter 56 has been reset, and it supplies a signal to the stepping motor control unit 84. The stepping motor control unit 84 causes the stepping motor 86 to advance the thermally sensitive record material 90 in the direction shown by the arrows in FIGURES 1 and 6. The stepping motor 86 is coupled to the drive roller 88, which pulls the thermally sensitive record material 90 from the supply reel 92 over the spring-loaded pressure roller 94, which pulls away from the thermal print head 46*b* when the thermally sensitive record material 90 is under tension, due to rotation of the drive roller 88. The thermally sensitive record material 90 passes past a transparent viewing window 91 and between the drive roller 88 and the idler roller 95, where it may be stored on a take-up reel or cut as desired.

Thus, the first group of P data bits which are received from the data processor results in printing information in the form of a row of dots 98. Following the completion of the printing of the row of dots 98, the stepping motor 86 advances the thermally sensitive record material 90, in the manner described, so that the second group of P data bits results in the printing of the second row of dots 100. In this manner, the desired information may be printed on the thermally sensitive record material 90 by the printing of a number of rows of dots in succession, in the example of FIGURE 6 the number of rows necessary to complete the desired line of characters 102 being seven rows.

Since the remote thermal printing system of the present invention is under control of the data processor, the data processor must be able to reset both the N-stage counter 34 and the M-stage counter 56 when the data processor has completed transmission of the desired message, or when spacing between the lines of printed dots is required. The one-shot multi-vibrator 26 supplies the waveform H to the AND gate 104, and the inverter 28 supplies the waveform G to the AND gate 104, so that the AND gate 104 produces the waveform I. It is seen that the waveform I, which results in the resetting of the N-stage counter 34 and the M-stage counter 56, occurs only when the G waveform remains at a "1" logic level for a period of time that is longer than the period of the one-shot multi-vibrator 26. This is a safety precaution to insure that a temporary loss of transmission between the data processor and the remote thermal printing system will not result in resetting of the N-stage counter 34 or the M-stage counter 56. For example, the dotted portions of the waveforms F, G, and H in FIGURE 3 represent a temporary loss of transmission that is less than the period of the one-shot multi-vibrator 26. It is seen from the dotted portions of the waveforms F, G, and H that a temporary loss of transmission for a period of time that is less than the period of the one-shot multi-vibrator 26 will not produce a reset pulse from the AND gate inverter 104, since, by the time that the waveform H reaches a "1" logic level, the waveform G will be at a "0" logic level. However, when data transmission is interrupted for a period of time that is greater than the period of the one-shot multi-vibrator 26, the counters 34 and 56 will be reset by a reset pulse from the AND gate inverter 104, and the stepping motor 86 will advance the thermally sensitive record material 90.

Although the preferred embodiment of the present invention, as illustrated in FIGURE 2, employs seven silicon controlled-rectifiers and five grounding transistors, it is apparent that the number of silicon controlled-rectifiers and grounding transistors which are to be employed is a matter of discretion, and, therefore, no limitation is intended within the scope of the present invention. In actual practice, as many as fifteen silicon controlled-rectifiers and ten grounding transistors have been employed.

What is claimed is:

1. A printer comprising:

(a) P energizable printing elements, and (b) N gate means each coupled to $P/N$ printing elements, and (c) M gate means each coupled to $P/M$ printing elements, where N multiplied by M equals P, the simultaneous energization of an M gate means and an N gate means being effective to energize a predetermined one of the printing elements, and (d) a receiving means to sequentially receive data bits and to receive clock bits from a remote source, and (e) N-stage shift register storage means which is coupled to the receiving means to store the received data in groups of N data bits, and (f) transfer means to supply N data bits as energization signals from the data storage means to the N gate means upon the completion of each storage cycle of N data bits, the transfer means including an N-stage counting means, the receiving means receiving a clock bit from the remote source each time that a data bit is received from the remote source, the clock bits being coupled to the storage means so as to effect shifting of the data bits through a storage means one stage at a time each time that a clock signal is received and to the N-stage counting means so that the count of the N-stage counting means is augmented once for each received clock bit, the N-stage counting means being constructed to reset itself upon completion of each N count, and (g) energization means to supply a signal to the M gate means so that the energization of a different one of the M gate means occurs upon the completion of each storage cycle of N data bits, the energization means including an M-stage counting means, the M-stage counting means being coupled to the N-stage counting means to receive a counting signal from the N-stage counting means so that the count of the M-stage counting means is augmented once each time that the N-stage counting means completes N-counts, the M-stage counting means being constructed to reset itself upon the completion of each M count, and (h) means to reset the N-stage and the M-stage counting means whenever data bits are not received by the printer for a predetermined period of time.

2. A printer as in claim 1 wherein the energizable printing elements are thermal printing elements.

3. A printer as in claim 1 wherein:

(a) a first differential amplifier is coupled to the receiving means to amplify received data signals, and (b) a second differential amplifier is coupled to the receiving means to amplify inverted received data signals, and (c) a third differential amplifier is coupled to the receiving means to amplify the received clock signal, and (d) a first clock flip-flop is coupled to the outputs of the first and third differential amplifiers to reproduce the waveform of the first differential amplifier with improved rise and fall times, and (e) a second clock flip-flop is coupled to the outputs of the second and third differential amplifiers to reproduce the waveform of the second differential amplifier with improved rise and fall times.

4. A printer as in claim 3 wherein the energizable printing elements are thermal printing elements.

References Cited

UNITED STATES PATENTS

| | | | |
|---|---|---|---|
| 2,985,835 | 5/1961 | Stuart. | |
| 3,213,195 | 10/1965 | Gryk | 178—17.5 |
| 3,351,769 | 11/1967 | Davis | 307—252 |
| 3,354,817 | 11/1967 | Sakurai et al. | 178—23 |
| 3,387,081 | 6/1968 | Kleinschmidt et al. | 178—30 |

THOMAS A. ROBINSON, Primary Examiner

M. M. CURTIS, Assistant Examiner

U.S. Cl. X.R.

178—30